(No Model.)

C. A. ANDRUS.
FEEDING MECHANISM FOR GRAIN, FLOUR, &c.

No. 353,436. Patented Nov. 30, 1886.

WITNESSES:
C. Neveux
C. Sedgwick

INVENTOR:
C. A. Andrus
BY Munn & Co.
ATTORNEYS.

UNITED STATES PATENT OFFICE.

CHARLES A. ANDRUS, OF LA GRANGE, OHIO.

FEEDING MECHANISM FOR GRAIN, FLOUR, &c.

SPECIFICATION forming part of Letters Patent No. 353,436, dated November 30, 1886.

Application filed June 18, 1886. Serial No. 205,543. (No model.)

*To all whom it may concern:*

Be it known that I, CHARLES A. ANDRUS, of La Grange, in the county of Lorain and State of Ohio, have invented a new and Improved Feeding Mechanism for Grain, Flour, &c., of which the following is a full, clear, and exact description.

The invention consists in the peculiar construction and arrangement of parts, as hereinafter fully described, and pointed out in the claim.

Reference is to be had to the accompanying drawings, forming a part of this specification, in which similar letters of reference indicate corresponding parts in all the figures.

Figure 1:
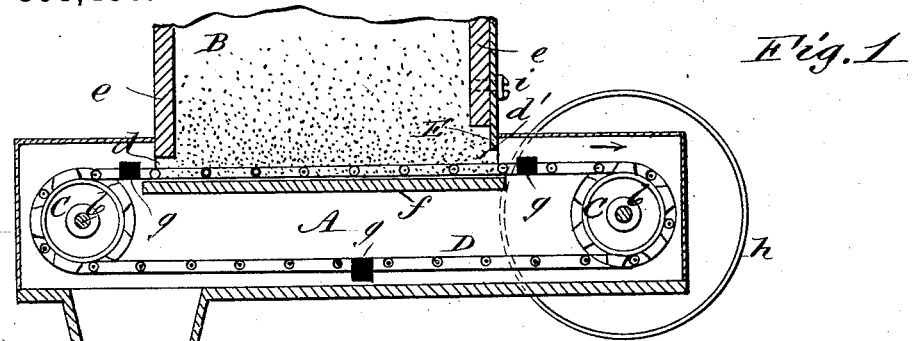
Figure 2:
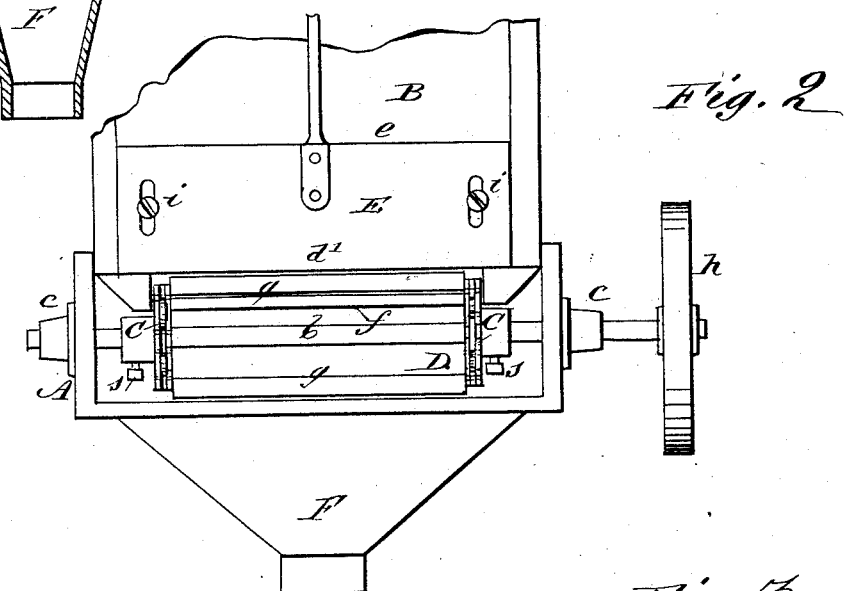
Figure 3:
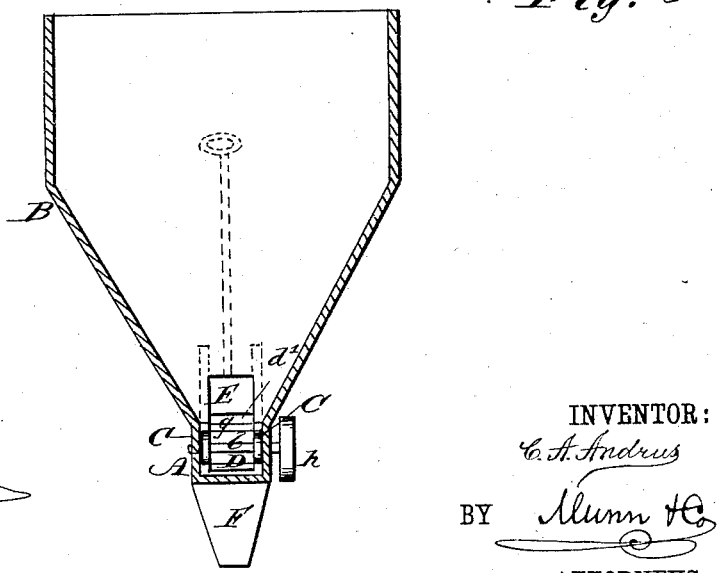

Figure 1 represents a sectional elevation of my improved feed mechanism as applied to a bin or chest such as used for holding flour, middlings, dustings, &c.; and Fig. 2 is a partly-sectional end view of the same. Fig. 3 is a transverse section showing the invention as applied to a hopper for feeding grain and other like substances.

In Figs. 1 and 2, A is a close case or box placed across and beneath the bottom of a bin, chest, or other receptacle, B, and extending beyond the opposite sides or ends of the latter. Arranged within the extended ends of the case A, upon cross shafts or spindles $b\ b$, which are supported by bearings $c\ c$ on the sides of the case, are sprocket wheels or pulleys C, each spindle carrying a pair of said wheels or pulleys, that may be secured on their spindle by set-screws $s$.

The case A is of a width corresponding to the size of the bin B in the same direction, or thereabout, and is in communication with the interior of the bin at its bottom by elongated apertures $d\ d'$, made in the sides or ends $e$ of the bin immediately above its bottom $f$, which is extended a short distance beyond said sides, for a purpose that will be hereinafter explained.

The several sprocket wheels or pulleys C are of such a size and so arranged as to reach up to about the level of the top of the bin-bottom $f$, and serve to carry and operate an endless link or other suitable belt, D, which may consist of two parallel chains or lines of links, to which are attached cross-projecting strips or slats $g$, or said belt or endless flexible conveyer may be otherwise suitably constructed. This belt in its upper line of travel moves over the top of the bin-bottom $f$ and carries its slats over said bottom and into and out of the openings $d\ d'$ in the sides of the bin, the belt D being of a width to pass freely through said openings, and the slats $g$ being of a length corresponding, or nearly so, to them, and of a depth somewhat less than that of said openings, so as to work freely through them.

Upon rotating in a suitable direction one spindle $b$, as by a pulley, $h$, outside of the case, the flexible endless conveyer D will feed or pass the material from the bin in an even stream or manner through or below a gate, E, upon the discharge side of the bin into the case A, from whence it is delivered by a hopper-like spout, F, in the bottom of the case. This spout is of about the same length as the slats $g$ of the conveyer, and of suitable breadth and depth to insure a free passage of the material being fed or worked. Said spout may be placed at any point along the bottom of the case A that it may be desirable to make the delivery at, as the material is drawn by the slats $g$ out of the discharge side of the bin, and, falling to the bottom of the case, is passed by said slats in their lower or return line of travel to the point of discharge in the case.

The discharge-opening $d'$ in the side of the bin or receptacle is made deeper than the opposite opening, $d$, and has the upper portion of its area controlled by the gate E, which is adjustable up and down, to regulate the amount of material carried out of the bin, by the slats $g$ of the conveyer as they pass through the aperture $d'$. Stops $i$ of any suitable kind should be applied to said gate to prevent its closing down upon the endless conveyer, belt, or slats.

The bottom $f$ of the bin or chest is extended a short distance beyond the sides or ends $e$, so as to prevent any material from running, unless carried by the slats, out of the openings in the sides of the bin.

When the feed mechanism is applied to feeding grain or other like stock, the receptacle B, as shown in Fig. 3, may be in the form of a hopper with sloping sides, the endless conveyer D then being arranged in direction of the length of the hopper within the case A, provided with a discharge-spout, F; but the devices are similar, and the principle of action is the same as hereinbefore described, the shape or character of the receptacle holding the material to be fed being varied as required.

This feed mechanism, which is both simple and durable, secures both a sure and positive feed or discharge from the bin or other receptacle, subject to regulation as regards the amount of material passed out of the receptacle, and is applicable to a large range of work or handling of every kind of stock in a mill, from the natural grain to the softest and most difficult stock in a mill to handle, feeding all alike with certainty and precision. The device, too, being under cover of a close case, only open at the discharge, the stock being fed cannot sift or dust and waste, and the mechanism is in every way economical, requiring but little power to work it.

Having thus described my invention, what I claim as new, and desire to secure by Letters Patent, is—

An improved feed mechanism for grain, flour, &c., consisting of the box A, provided with the spout F, the receptacle B, having its bottom $f$ projecting beyond its sides, and provided with the elongated apertures $d$ $d'$, the adjustable gate E, the sprocket-wheels C, journaled in the box A, and the endless belt D, provided with the cross-bars $g$, substantially as herein shown and described.

CHARLES A. ANDRUS.

Witnesses:
R. H. GOODWIN,
PAUL HOLCOMB.